(12) United States Patent
Petipas et al.

(10) Patent No.: US 10,246,787 B2
(45) Date of Patent: Apr. 2, 2019

(54) CONTROL OF A HIGH TEMPERATURE ELECTROLYZER

(71) Applicant: ELECTRICITE DE FRANCE, Paris (FR)

(72) Inventors: Floriane Petipas, Karlsruhe (DE); Annabelle Brisse, Herlisheim (FR); Chakib Bouallou, Antony (FR)

(73) Assignee: ELECTRICITE DE FRANCE, Paris (FR)

( * ) Notice: Subject to any disclaimer, the term of this patent is extended or adjusted under 35 U.S.C. 154(b) by 380 days.

(21) Appl. No.: 15/031,778

(22) PCT Filed: Oct. 22, 2014

(86) PCT No.: PCT/FR2014/052678
§ 371 (c)(1),
(2) Date: Apr. 25, 2016

(87) PCT Pub. No.: WO2015/059404
PCT Pub. Date: Apr. 30, 2015

(65) Prior Publication Data
US 2016/0244890 A1    Aug. 25, 2016

(30) Foreign Application Priority Data

Oct. 25, 2013  (FR) .................................. 13 60471

(51) Int. Cl.
*C25B 1/04*         (2006.01)
*C25B 9/00*         (2006.01)
(Continued)

(52) U.S. Cl.
CPC ................ *C25B 15/02* (2013.01); *C25B 1/04* (2013.01); *C25B 9/00* (2013.01); *C25B 9/20* (2013.01); *Y02E 60/366* (2013.01); *Y02P 20/133* (2015.11)

(58) Field of Classification Search
CPC ..................................................... C25B 15/02
See application file for complete search history.

(56) References Cited

U.S. PATENT DOCUMENTS 7,662,497 B2    2/2010  Lamp et al.
8,500,971 B2    8/2013  Le Gallo et al.
(Continued)

FOREIGN PATENT DOCUMENTS

DE   10 2004 045 375 A1    3/2006
FR        2 921 390 A1     3/2009
(Continued)

OTHER PUBLICATIONS

PCT/EP2013/54871, Mar. 11, 2013 (Year: 2013).*
(Continued)

*Primary Examiner* — Nicholas A Smith
(74) *Attorney, Agent, or Firm* — Drinker Biddle & Reath LLP (57) ABSTRACT

A process for controlling a high temperature electrolyzer in which the one or more stacks of cells are arranged in an enclosure pre-heated to a high temperature and thermally insulated, where the electrolyzer is connected to an electric energy source for its power supply in order to implement an electrolytic reaction and where the process includes: monitoring of the power supplied by the energy source; redirecting upstream of the electrolyzer a portion of the power supplied by the energy source in order to heat the one or more stacks of cells when the value of the power supplied becomes lower than a previously set limit value; otherwise, no redirecting. A process for production of hydrogen or syngas incorporating the above driving process, where a driving system implements the above driving process and a hydrogen production system implements the corresponding hydrogen production process.

11 Claims, 5 Drawing Sheets

(51) Int. Cl.
*C25B 9/20* (2006.01)
*C25B 15/02* (2006.01)

(56) References Cited

U.S. PATENT DOCUMENTS

2009/0325014 A1   12/2009   Newkirk
2010/0140102 A1   6/2010    Aujollet

FOREIGN PATENT DOCUMENTS

| JP | 2007-046110 A | | 2/2007 | |
|----|---------------|---|--------|---|
| JP | 2007046110 A | * | 2/2007 | |
| WO | 2012/003849 A1 | | 1/2012 | |
| WO | 2012/153230 A1 | | 11/2012 | |
| WO | 2013/060869 A1 | | 5/2013 | |
| WO | WO-2014139822 A1 | * | 9/2014 | C25B 1/04 |

OTHER PUBLICATIONS

Diethelm et al., "Electrolysis and Co-Electrolysis Performance of SOE Short Stacks," Fuel Cells, vol. 13(4), Jul. 30, 2013, pp. 631-637.

Graves et al., "Co-electrolysis of CO2 and H2O in solid oxide cells: Performance and durability," Solid State Ionics, vol. 192(1), Jul. 16, 2010, pp. 398-403.

Quandt et al., "Concept and Design of a 3.5 MW Pilot Plant for High Temperature Electrolysis of Water Vapor," International Journal of Hydrogen Energy, Elsevier Science Publishers B.V., Barking, GB, vol. 11(5), 1986, pp. 309-315.

Wang et al., "Steam electrolysis performance of intermediate-temperature solid oxide electrolysis cell and efficiency hydorgen production system at 300 Nm3 h-1," International Journal of Hydrogen Energy, Elsevier Science Publishers B.V., Barking, GB, vol. 35(10), Mar. 23, 2010, pp. 4451-4458.

Office Action issued in related application JP 2016-525908, with English language translation, dated May 8, 2017, 9 pages.

Office Action issued in related application JP 2016-525908, with English language translation, dated Sep. 15, 2017, 9 pages.

Schiller et al., "High temperature water electrolysis using metal supported solid oxide electrolyser cells (SOEC)," Journal of Applied Electrochemistry, Kluwer Academic Publishers, Oct. 7, 2008, vol. 39(2), pp. 293-301.

Examination Report issued in related application EP 14805972.8, dated Jan. 29, 2018, 5 pages.

\* cited by examiner

CONTROL OF A HIGH TEMPERATURE ELECTROLYZER

CROSS-REFERENCE TO RELATED APPLICATIONS

This application is the U.S. national phase of the International Patent Application No. PCT/FR2014/052678 filed Oct. 22, 2014, which claims the benefit of French Application No. 13 60471 filed Oct. 25, 2013, the entire content of which is incorporated herein by reference.

FIELD

This application relates to the technical domain of high temperature electrolyzers. More specifically, it is a question of the technical domain of methods for driving such electrolyzers, in particular for the production of hydrogen and/or synthetic gas (also called syngas). It is also a question of a system for driving [i.e. controlling] such electrolyzers and a production system comprising such a driving system.

BACKGROUND

Today hydrogen is considered to be a promising energy resource. Unfortunately, its application runs up against production difficulties. In fact, the yields for industrial hydrogen production, in particular starting from water less polluting than production from hydrocarbons, are still unsatisfactory.

Nonetheless, some methods are encouraging, such as High-Temperature Electrolysis (HTE). HTE consists of electrolyzing steam at a temperature from 500° C. to 1000° C. using electric energy supplied by means of a high temperature electrolyzer. Such an electrolyzer includes a plurality of cells. Each cell includes a porous cathode and a porous anode and also an electrolyte impermeable to the gases. The electrolyte is arranged in contact with the cathode and the anode and in between them. A voltage is applied between the cathode and the anode. A flux of steam is directed towards the cathode. The voltage applied causes the cracking of the water: the water is transformed into hydrogen and oxygen. The hydrogen is released from the cathode side while the oxygen is released from the anode side:

reduction at the cathode: $2H^+ + 2e^- \rightarrow H_2$; 
oxidation at the anode: $2H_2O \rightarrow O_2 + 4H^+ + 4e^-$; 
global reaction: $2H_2O \rightarrow 2H_2 + O_2$.

The overall energy necessary to allow this reaction can be supplied by electric energy coming from an electrical source such as an electric power plant and/or by thermal energy coming from a heat source.

The electrolytic reaction by itself is an endothermic reaction. Thus, if the electric energy supply is insufficient to cover the needs both electrical and thermal (via resistive heating taking place inside the one or more stacks of cells), then the electrolytic reaction is going to drain thermal energy from the gas traversing the cells which would end with a drop in the temperature inside the enclosure in which the cells are arranged: this is the endothermic mode of operation.

Solutions exist for operating an electrolyzer at high temperature in endothermic mode. For example, document WO2013/060869 describes a thermal management process for a high temperature electrolyzer, wherein the energy is stored by means of energy storage during a phase of exothermic operation of the electrolyzer (meaning that the electric energy supply is greater than the needs of the electrolytic reaction), for example at 1.5 V, when the electric energy price is low and wherein this stored energy is recovered in the form of heat during an endothermic operating phase of the electrolyzer, for example 1.2 V, when the price of electric energy is high.

This solution is satisfactory when the electrolyzer is connected to an electric source which produces sufficient energy. The exothermic mode/endothermic mode cycle, meaning the length of the exothermic mode and the length of the endothermic mode, is determined by the operator who can consequently choose the storage means suited to this cycle.

The HTE in combination with a renewable electric energy source, such as wind, water current, solar, hydroelectric, geothermal etc. could allow the production of hydrogen from renewable energy sources. Unfortunately, renewable electric energy sources are generally intermittent and/or fluctuating sources which do not allow continuous, constant and predictable energy production.

Consequently, the process from document WO2013/060869 can only be partially used in such a case.

Additionally, the electrolyzer includes elements which are sensitive to thermal gradients, meaning to a temperature difference between 2 points or 2 stacks of cells. An excessive temperature variation between different points of the electrolyzer can deteriorate these elements or even lead to their destruction.

Thus, in the case where the electrolyzer is supplied by renewable electric energy source, it is possible that the energy supplied be extremely insufficient. The electrolyzer then drains the missing energy from the environment where it is located, meaning from the heat stored in the enclosure, leading to the appearance of thermal gradients within the enclosure. These thermal gradients can then go beyond 50° C./cm.

The patent FR2,921,390 provides a solution for managing the thermal gradients in the one or more stacks of cells constituting the high temperature electrolyzers. The selected solution consists of circulating steam inside the one or more stacks of cells via independent conduits in order to homogenize the temperature before directing it towards the cathodes. In exothermic mode, the excess heat is therefore evacuated via a circulation of steam having a temperature below the temperature of the cells. In endothermic mode, the heat deficit is supplied via circulation of steam having a temperature greater than the temperature of the cells. This solution can only be implemented in endothermic mode if a source of very high temperature steam is available.

The disadvantage of this solution is that it requires providing a fluid circuit in order to conduct the steam through the various cells of the electrolyzer. Thus, this solution is architecturally complex. Additionally, when the power supplied by the energy source is very insufficient (endothermic mode), a very high temperature heat source must be available to cover the thermal needs of the reaction.

Thus the solutions from the prior art still require improvements in order to be able to propose a process with which to operate an electrolyzer at high temperature supplied with electricity by an intermittent energy source and in particular a renewable energy source.

SUMMARY

As indicated above, an objective of the present invention is to remedy at least one disadvantage from the prior art described above.

To do that, the present invention proposes a process for driving a high temperature electrolyzer comprising one or more stacks of cells, where the one or more stacks of cells are arranged in an enclosure pre-heated to a high temperature and thermally insulated, where the electrolyzer is connected to an electric energy source for its power supply in order to implement an electrolytic reaction and where the process comprises:

Monitoring of the power supplied by the energy source;

Redirecting upstream of the electrolyzer a portion of the power supplied by the energy source in order to heat the one or more stacks of cells when the value of the power supplied becomes lower than a previously set limit value;

Otherwise, no redirecting.

Because of such a process, and as will be explained in more detail below, a portion of the energy supplied to the electrolyzer is, under some conditions, under thermal form and its proportion is directly dependent on the supply provided by the energy source. Thus, it is possible to operate the electrolyzer over a large power range.

Other optional and nonlimiting features are:

The previously set limit value is chosen as the value of the power at which thermal gradients greater in absolute value than 50° C./cm appear inside the enclosure;

Since the electrolyzer cells have a surface area S, and because the distance between the inlet of the gases and the outlet of the gases in a cell is L, the limit value $P_{min}$ per cell is chosen equal to:

$$P_{min} = E(T_{min}) \cdot j(T_{min}) \cdot S;$$

where:

$$T_{min} = T_{water} - \frac{L \cdot \Delta T}{2};$$

$$E(T) = E_N(T) + j(T) \cdot ASR;$$

$$E_N(T) = \frac{\Delta_r G^0(T)}{2 \cdot F} + \frac{R \cdot T}{2 \cdot F} \cdot \ln\left(\frac{SC/2}{1 - SC/2}\right);$$

$$j(T) = \frac{A(T)}{2 \cdot F \cdot ASR} - \frac{E_N(T)}{ASR};$$

$$A(T) = \frac{L \cdot \Delta T}{2} \cdot$$

$$\left(c_{PH2}(2T - T_{water}) + \frac{c_{PO2}(2T - T_{water})}{2} - \frac{c_{PH2O}(T_{water})}{SC}\right) + \Delta_r H(T);$$

where $T_{water}$ is the temperature of the steam entering near the cathode; $\Delta T$ is the maximum tolerable temperature gradient;

$c_{PH_2}$ is the thermal capacity of the hydrogen at constant pressure;

$c_{PO_2}$ is the thermal capacity of the oxygen at constant pressure;

$c_{PH_2O}$ is the thermal capacity of the water at constant pressure; $\Delta_r H$ is the enthalpy of reaction of the electrolysis of water; $\Delta_r G$ is the free enthalpy of reaction of the electrolysis of water; SC is the rate of conversion of water into hydrogen; ASR is the resistivity of the surface of one or more stacks of cells; F is the Faraday constant; and R is the ideal gas constant;

The redirected power per cell $P_{red}$ can be obtained by iteration of the following equations until convergence by taking $P_{red,0}=0$ and $P_0=P_{source}$ as initial values, where P is the part of the power applied to the electrolyzer and $P_{source}$ is the power provided by the electric energy source:

$$P_{red,m+1} = A(T_{min}) \cdot \dot{n}_m(T_{min}) - P_m;$$

with:

$$\dot{n}_m(T) = \frac{S}{2 \cdot F} \cdot \left(-\frac{E_N(T)}{2 \cdot ASR} + \sqrt{\frac{P_m}{S \cdot ASR} + \left(\frac{E_N(T)}{2 \cdot ASR}\right)^2}\right);$$

$$P_m = P_{source} - P_{red,m};$$

with m≥0 (m greater than or equal to 0; m indicating the order of the iteration);

L is the distance between the inlet and the outlet of the gases in a cell, where the steam entering from the side of the cathodes is at a temperature $T_{water}$ and $\Delta T$ represents the maximum tolerable temperature gradient, then the limit value of the power below which the redirect is implemented is equal to the power for which the temperature $T_{outlet}$ of the gases at the outlet of the one or more stacks is equal to:

$$T_{outlet} = T_{water} - \Delta T \cdot L;$$

The electric energy source is an intermittent and/or fluctuating energy source; and The energy source is a renewable energy source.

The invention also proposes a process for production of hydrogen or syngas comprising the steps of:

Preheating a thermally insulated enclosure, in which the one or more stacks of a high temperature electrolyzer are arranged, to a high temperature;

Supplying the electrolyzer with power from an electric energy source;

Circulating water to the cathodes of the electrolyzer to implement an electrolytic reaction;

Driving the electrolyzer as described above;

Recovering near the anodes the oxygen generated by the electrolytic reaction;

Recovering near the cathodes the hydrogen generated by the electrolytic reactions and possibly the carbon monoxide in the case of syngas production.

Because thermal gradients can be avoided even at very low power, it is possible to operate a high temperature electrolyzer supplied by a renewable energy source which by its nature is an intermittent and/or fluctuating energy source with periods of low energy production and to produce hydrogen preferably ecologically.

However, the present invention is not limited to the production of hydrogen by a renewable energy source and the use of any type of electric power plant, whatever its chain, for powering the electrolyzer is also conceivable.

The invention also proposes a system for driving for a high temperature electrolyzer comprising one or more stacks of cells arranged in an enclosure pre-heated to a high temperature and thermally insulated, where the electrolyzer is supplied by an energy source, comprising:

A heater to be connected to the energy source for supplying it with power and to be arranged near the one or more stacks of cells for heating thereof;

A switch to be arranged between the energy source and the heater for cutting and/or adjusting the supply thereto;

A controller to be connected to the energy source in order to monitor the power provided thereby and connected to the switch for the control thereof.

Finally, the invention proposes a system for production of hydrogen or syngas comprising:

A high temperature electrolyzer;

An energy source connected to the electrolyzer for supplying the electrolyzer with power;

A thermally insulated enclosure in which the one or more stacks of cells of the electrolyzer are arranged; and A system for driving the electrolyzer such as described above.

BRIEF DESCRIPTION OF THE DRAWINGS

Other objectives, properties and advantages will appear upon reading the following detailed description with reference to the drawings given for illustration and nonlimiting, among which:

FIG. 6b is an enlargement of FIG. 6a; and

DETAILED DESCRIPTION

Throughout the following description, the power to be provided to a high temperature electrolyzer is discussed. However, the power is sometimes difficult to adjust directly; this is why it is sometimes preferable to control the voltage or current applied to the terminals of the electrolyzer. The person skilled in the art will not have any difficulty adapting the teaching of the following disclosure to the adjustment of the voltage or current instead of the power. It will then be understood that the embodiments where the voltage or current supplied to the terminals of the electrolyzer is considered instead of the power are an integral part of the present invention.

Additionally, throughout the following description, the systems and processes are described in connection with the production of hydrogen. However, the systems and processes described also serve production of syngas by co-electrolysis. This objective is an integral part of the present invention and the person skilled in the art will know how to adapt the description below to this type of production in particular by introducing at the inlet of the cathodes steam mixed with carbon dioxide ($CO_2$); the gases produced coming from the cathodes are then hydrogen and carbon monoxide (CO).

Figure 1:
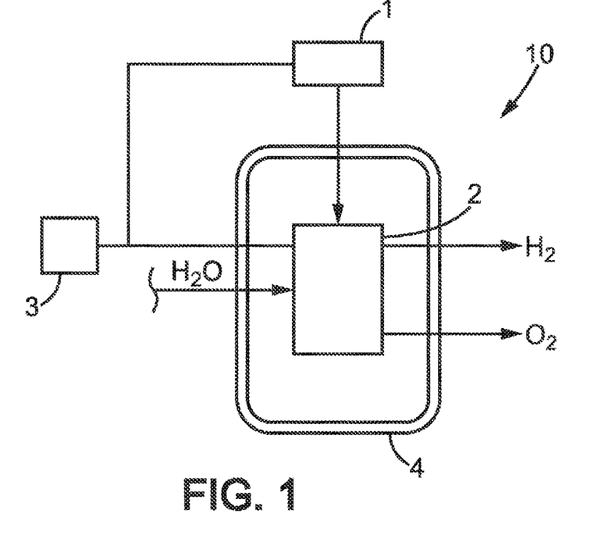
FIG. 1 is a schematic illustration of an example of a hydrogen and/or syngas production system according to the invention.
Figure 2:
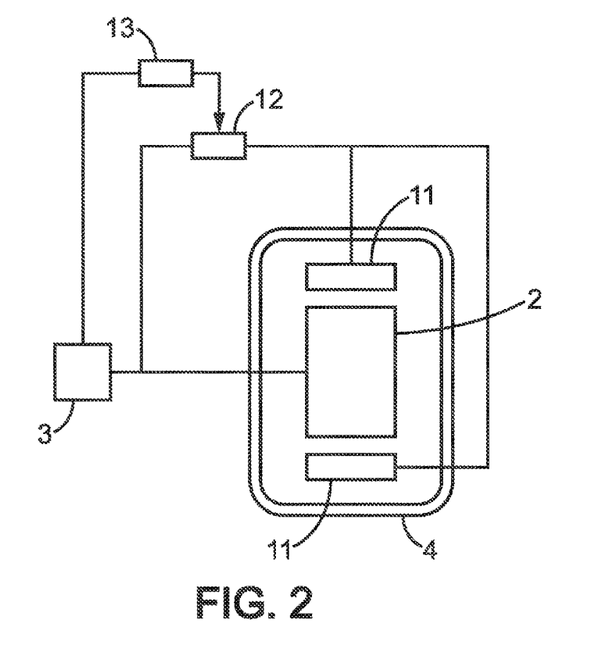
FIG. 2 is a schematic illustration of the system from FIG. 1 with the driving system detailed.
Figure 3:
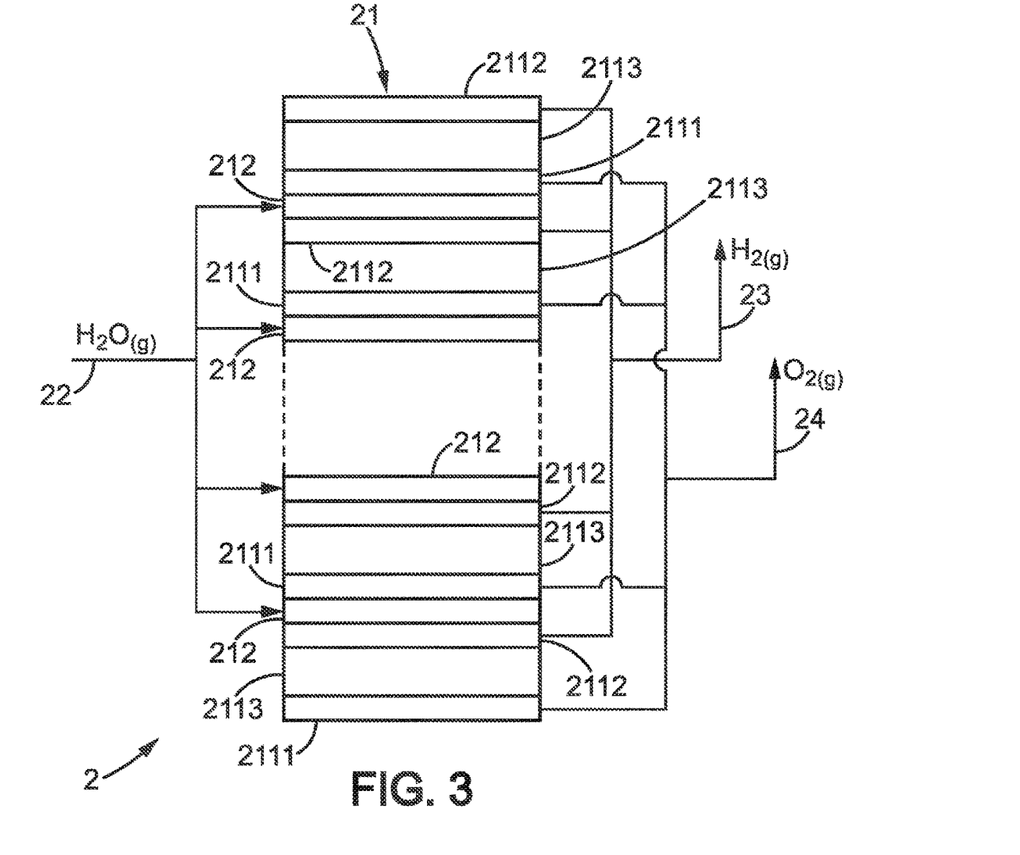
FIG. 3 is a schematic and detailed illustration of the high temperature electrolyzer used in the system from FIG. 1.

A hydrogen production system according to the invention is described below with reference to FIGS. 1 to 3.

This system 10 for hydrogen production includes a high temperature electrolyzer 2, an energy source 3, and enclosure 4 and the system 1 for driving the electrolyzer. The electrolyzer 2 comprises at least one stack 21 of cells. Each cell comprises a porous cathode 2112, a porous anode 2111 and an electrolyte 2113 arranged between the cathode 2112 and the anode 2111 and in contact therewith. The cathode 2112, the anode 2111 and the electrolyte 2113 are for example metal or ceramic and preferably ceramic. Two cells are separated from each other by a bipolar plate 212, also called interconnector. The interconnector 212 is electrically conducting and comprises fluid circulation channels (not shown in the drawings).

The electrolyzer also includes auxiliary components, among them at least one conduit 22 for bringing steam is intended for taking steam to the interconnector channels. A conduit 23 is also provided for evacuation and collection of hydrogen in order to extract the hydrogen formed near the cathodes by electrolysis away therefrom and a conduit 24 for evacuation of oxygen in order to take the oxygen formed near the anodes away therefrom. Other auxiliary components are also provided, in particular a heater for heating the inlet gases (which could comprise one or more heat exchangers), and which are known to the person skilled in the art; therefore, they are not described here for reasons of conciseness.

The energy source 3 is connected to the high temperature electrolyzer 2 to supply it with power. Here, the energy source 3 is a source of electric energy, for example chosen among: a wind turbine, a set of wind turbines, a water current turbine, a set of water current turbines, a solar panel, a set of solar panels, a geothermal power plant, thermal power plant, a nuclear power plant and a hydroelectric power plant.

Preferably, the energy source 3 is a renewable electric energy source. For example, the energy sources chosen among: a wind turbine, a set of wind turbines, a water current turbine, a set of water current turbines, a solar panel, a set of solar panels, a geothermal power plant, and a hydroelectric power plant, without the list being limiting.

The enclosure 4 is formed of a thermal insulator which can support high temperatures, typically up to 1,000° C. The one or more stacks of the electrolyzer are arranged inside this enclosure in order to minimize thermal losses. The heater 11 can be provided in order de the closure in advance before putting the electrolyzer and operation.

The driving system 1 is connected to the electrolyzer 2 and the energy source 3. The driving system 1 includes a heater 11, a switch 12 and a controller 13.

The heater 11 is connected to the energy source 3 for its own supply of power and is arranged near the one or more stacks of cells. The heater 11 heats by resistive heating the one or more stacks of cells of the electrolyzer and more specifically each of the cells composing the one or more stacks.

The heater 11 can be composed of one or several electrical resistances arranged within (for example integrated with the interconnectors) or around the one or more stacks of cells.

The switch 12 is arranged between the energy source 3 and the heater 11 for cutting and/or adjusting the supply thereof.

The controller 13 is connected to the energy source in order to monitor the power supplied thereby and connected to the switch 12 in order to control it as a function of the measured power supplied.

Figure 4:
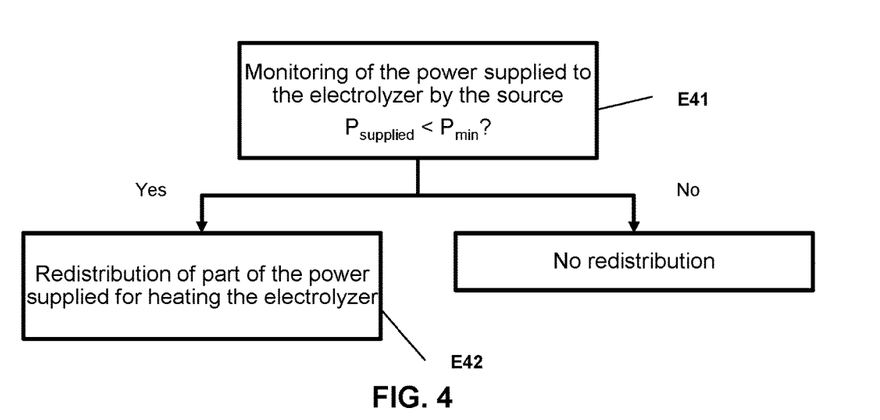
FIG. 4 is a diagram showing the steps of an example of a process for driving according to the invention.

With reference to FIG. 4, a process is described for driving the high temperature electrolyzer whose one or more stacks of cells are arranged in an enclosure pre-heated to a high temperature and thermally insulated, where the electrolyzer is connected to an energy source for the supply thereof with power, This driving process can be implemented by the driving system described above which is part for example of a hydrogen production system also described above.

The piloting process includes:
Monitoring E41 of the power supplied by the energy source;
Redirecting E42 upstream of the electrolyzer a portion of the power supplied by the energy source in order to heat the one or more stacks of cells when the value of the power supplied becomes lower than a previously set limit value;

Thus, because of such a process, under some conditions a portion of the energy supplied to the one or more stacks of cells is in thermal form and its portion is directly dependent on the supply received from the energy source. This makes it possible to regulate the temperature within the enclosure and in that way to avoid thermal gradients inside the enclosure of more than 50° C./cm, preferably of more than 20° C./cm, more preferably of more than 10° C./cm and always preferably of more than 5° C./cm.

In fact, the overall energy necessary to allow this electrolytic reaction can be supplied by the electric energy coming from an electrical source such as electric power plant and/or by thermal energy coming from a heat source.

Additionally, when electric energy is supplied to the one or more stacks of cells, a portion is dissipated by resistive heating near the one or more stacks of cells in the form of heat contributing to the thermal needs of the electrolytic reaction.

In that way, it is possible to completely cover the needs of the reaction by contribution of the electric source alone if the energy dissipated fully compensates the thermal energy needs.

In the case where the one or more stacks of cells of the electrolyzer are arranged in a thermally insulated enclosure and pre-heated, as is called for here, if the energy necessary for the reaction is supplied solely by an electric source, 3 operating modes can be identified according to the energy supplied:

(a) The endothermic mode at low power for which the thermal energy dissipated by resistive heating is less than the thermal needs of the reaction;

(b) The thermally neutral mode for which the thermal energy dissipated by the resistive heating is equal to the thermal energy necessary to the reaction; and (c) The exothermal mode at high power for which the thermal energy dissipated by resistive heating is greater than the thermal needs of the reaction.

In case (b), the electrolytic reaction is in energy equilibrium; there is therefore no need to supply other energy.

In case (a), the electrolytic reaction is running at a thermal energy deficit; it is going to consume the available thermal energy in its environment, meaning the heat which is available in the enclosure: thermal gradients then appear inside the enclosure.

In case (c), the electrolytic reaction has an excess of thermal energy. This excess is going to be evacuated in the form of heat causing thermal gradients inside the enclosure.

When the electrolyzer is connected to a renewable energy source, the case (a) is the most concerning. In fact, in order to resolve the problem of thermal gradients in the enclosure and exothermic mode, a sizing of the electrolyzer serves to align the maximum power thereof with the maximum power of the energy source, which serves to limit the thermal gradients which would then appear.

In endothermic mode, a portion of the power supplied by the energy source is redirected in order to heat the one or more stacks of cells when the value of the power supplied becomes lower than a previously set limit value.

As a function of the maximum thermal gradient tolerable by the stacks of cells (50° C./cm, or even lower: 20° C./cm, 10° C./cm or 5° C./cm), the preset limit value is advantageously chosen as the value of the power to provide so that the thermal gradients present inside the enclosure remain below this maximum tolerable thermal gradient, meaning below 50° C./cm, preferably below 20° C./cm, more preferably below 10° C./cm and still more preferably below 5° C./cm, if the redirection was not implemented. This power depends on the configuration of the stacks of cells and also on the materials used for the elements of the one or more stacks.

The portion redirected is a function of the maximum tolerable temperature gradient and the power supplied by the energy source.

For example, since the electrolyzer cells have a surface area S, and because the distance between the inlet of the gases and the outlet of the gases in a cell is L, the limit value $P_{min}$ per cell is chosen equal to:

$$P_{min} = E(T_{min}) \cdot j(T_{min}) \cdot S;$$

with:

$$T_{min} = T_{water} - \frac{L \cdot \Delta T}{2};$$

$$E(T) = E_N(T) + j(T) \cdot ASR;$$

$$E_N(T) = \frac{\Delta_r G^0(T)}{2 \cdot F} + \frac{R \cdot T}{2 \cdot F} \cdot \ln\left(\frac{SC/2}{1 - SC/2}\right);$$

$$j(T) = \frac{A(T)}{2 \cdot F \cdot ASR} - \frac{E_N(T)}{ASR};$$

$$A(T) = \frac{L \cdot \Delta T}{2} \cdot$$

$$\left(c_{PH2}(2T - T_{water}) + \frac{c_{PO2}(2T - T_{water})}{2} - \frac{c_{PH2O}(T_{water})}{SC}\right) + \Delta_r H(T);$$

where $T_{water}$ is the temperature of the steam entering near the cathode; $\Delta T$ is the maximum tolerable temperature gradient;

$c_{PH_2}$ is the thermal capacity of the hydrogen at constant pressure;

$$c_{P_{O_2}}$$

is the thermal capacity of the oxygen at constant pressure;

$$c_{P_{H_2O}}$$

is the thermal capacity of the water at constant pressure; $\Delta_r H$ is the enthalpy of reaction of the electrolysis of water; $\Delta_r G$ is the free enthalpy of reaction of the electrolysis of water; SC is the rate of conversion of water into hydrogen; ASR is the resistivity of the surface of one or more stacks of cells; F is the Faraday constant; and R is the ideal gas constant;

The thermal capacities at constant pressure ($C_p$), the reaction enthalpy ($\Delta_r H$) and the reaction free enthalpy ($\Delta_r G$) are known from tables of thermodynamic properties.

In order to obtain the limit value for the one or more stacks of the electrolyzer, it is sufficient to multiply the above limit value by the number of cells.

If the power provided is controlled on the basis of the voltage applied to the terminals of the electrolyzer, the voltage limit $E_{lim}$ is:

$$E_{min} = E_N(T_{min}) + j(T_{min}) \cdot ASR.$$

When the power provided by the electric energy source is less than this power limit $P_{min}$, a portion of the power is redirected so that the average temperature the enclosure is held at $T_{min}$.

The redirected power per cell $P_{red}$ can be obtained by iteration of the following equations until convergence by taking $P_{red,0}=0$ and $P_0=P_{source}$ as initial values, where P is the part of the power applied to the electrolyzer and $P_{source}$ is the power provided by the electric energy source:

$$P_{red,m+1} = A(T_{min}) \cdot \dot{n}_m(T_{min}) - P_m;$$

avec:

$$\dot{n}_m(T) = \frac{S}{2 \cdot F} \cdot \left( -\frac{E_N(T)}{2 \cdot ASR} + \sqrt{\frac{P_m}{S \cdot ASR} + \left(\frac{E_N(T)}{2 \cdot ASR}\right)^2} \right);$$

$$P_m = P_{source} - P_{red,m};$$

with m≥0 greater than or equal to 0; m indicating the order of the iteration.

Here again, in order to get the redirected power for the one or more stacks of the electrolyzer, it suffices to multiply the above redirected power by the number of cells.

In order to confirm that the temperature gradients inside of the enclosure remain at tolerable values, it is possible to only consider the temperature difference between the gases entering the one or more stacks and the gases leaving the one or more stacks. In fact, the temperature gradients appear mainly near the one or more stacks.

Thus, if L is the distance between the inlet and the outlet of the gases in a cell, where the steam entering from the side of the cathodes is at a temperature of $T_{water}$ and if $\Delta T$ represents the maximum tolerable temperature gradient, then the limit value of the power below which the redirection is implemented is equal to the power for which the temperature $T_{outlet}$ of the gases at the outlet of the one or more stacks is equal to:

$$T_{outlet} = T_{water} - \Delta T \cdot L.$$

The energy source is an intermittent and/or fluctuating energy source. An intermittent energy source designates a source whose production of electric energy is interrupted and then resumes by intervals, meaning that periods during which energy production is zero alternate with periods during which energy production is not zero. A fluctuating energy source designates a source whose electric energy production is not fixed at a constant value.

The intermittent and/or fluctuating energy source is preferably a renewable energy source. Thus, it is possible to use a renewable energy in order to supply the electrolyzer. Examples of such sources were given above. This is possible because of the driving process which makes it possible to follow the energy production of these energy sources which can sometimes drop very low.

Figure 5:
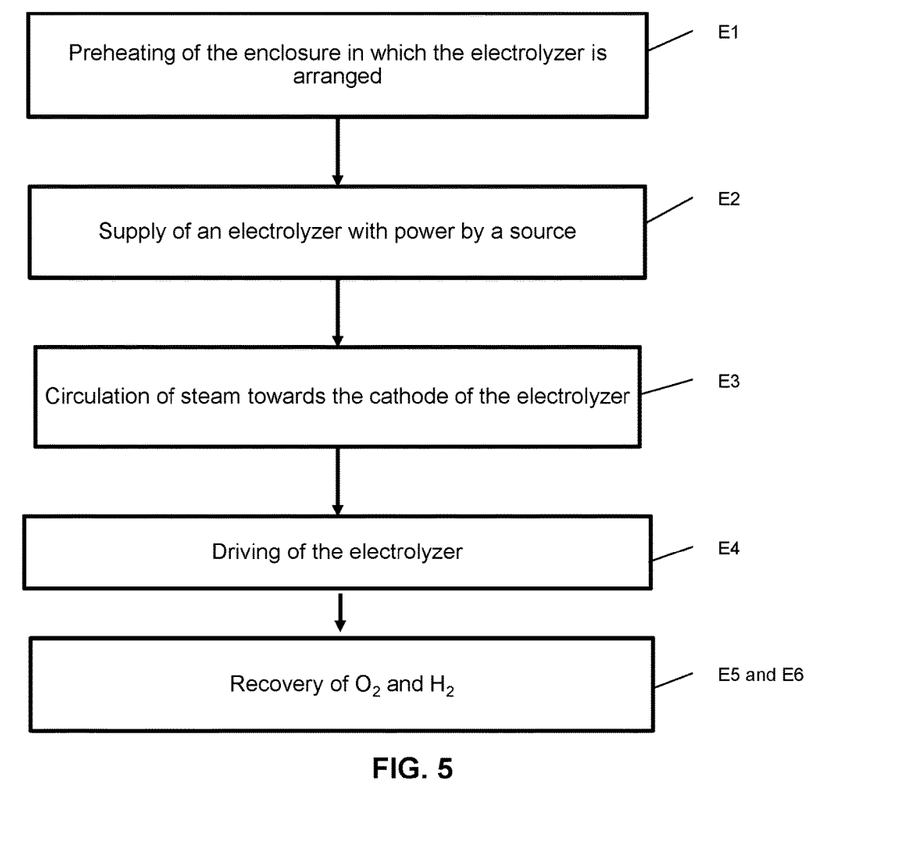
FIG. 5 is a diagram schematically showing the steps from an example of a hydrogen production process using the driving process from FIG. 4.

The driving process which was just described can be used in a hydrogen production process. Such an example is shown in FIG. 5 and comprises the following steps:

Preheating E1 a thermally insulated enclosure, in which the one or more stacks of a high temperature electrolyzer cells are arranged, to a high temperature;

Supplying E2 the electrolyzer with power from an energy source;

Circulating E3 steam to the cathodes of the electrolyzer to implement an electrolytic reaction;

Driving E4 the electrolyzer as described above;

Recovering E5 near the anodes the oxygen generated by the electrolytic reaction;

Recovering E6 near the cathodes the hydrogen generated by the electrolytic reaction and unconsumed steam;

Advantageously, the enclosure is pre-heated to a temperature included between 300° C. and 1000° C., preferably between 500° C. in 1000° C., still more preferably between 700° C. and 900° C., always preferably around the temperature of the entering steam. When the cells (i.e. cathodes, anodes and electrolytes) are of ceramic, the temperature to which the enclosure is heated is preferably between 500° C. in 1000° C., and more preferably between 700° C. and 900° C., always preferably around the temperature of the entering steam.

The temperature of the steam is typically included between 300° C. and 1000° C., preferably between 500° C. and 1000° C. and more preferably between 700° C. and 900° C. When the cells are ceramic, the temperature of the steam is preferably between 500° C. and 1000° C., more preferably between 700° C. and 900° C.

EXAMPLE

In the following example, the process is described in connection with the voltage applied to the terminals of the electrolyzer. The enclosure is heated to 800° C. in advance. The high temperature electrolyzer used includes electric resistances as heaters. The steam supplied to the cathodes is at 800° C. The maximum tolerable thermal gradient between the inlet and the outlet of each cell in absolute value is 10° C./cm. Each cell has a square shape of 10 cm on each edge and a resistivity of 0.5 $\Omega \cdot cm^2$ (ohm centimeter squared).

Thus, the temperature of the gases at the outlet of the cells is limited to 800±100° C. (since 100° C. is the maximum tolerable thermal gradient from one side of a cell to the opposite side), which would allow operation of the electrolyzer at a voltage from 1.29±0.03 V if the driving process were not implemented. The electrolyzer is sized such that the maximum voltage is equal to 1.32 V, which corresponds to a maximum power supplied by the source of 110 W. The limit value of the voltage is set at 1.25 V.

Below this value, a portion of the power supplied by the electric energy source is redirected towards the electrical resistances in order to maintain the temperature of the outlet gas at 700° C.; in this way, it can be assured that the temperature gradients inside a cell remain below 10° C./cm.

Figure 6A:
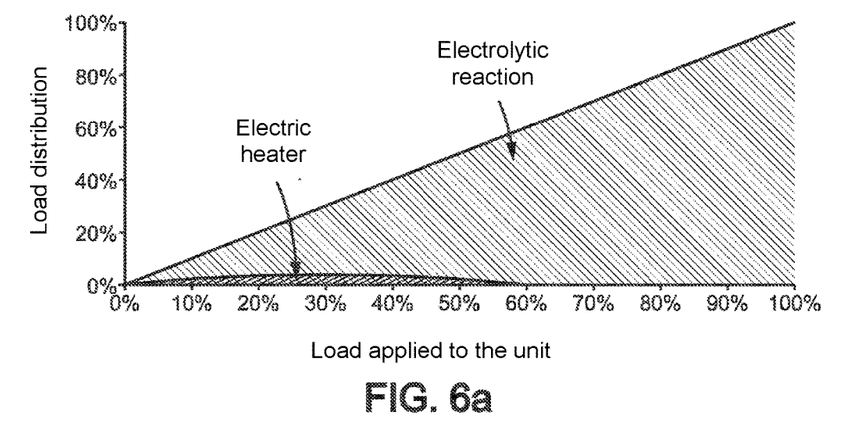
FIG. 6a is a graph showing the load applied to the electrolyzer and the electric heater as a function of the load coming from the electric source.
Figure 6B:
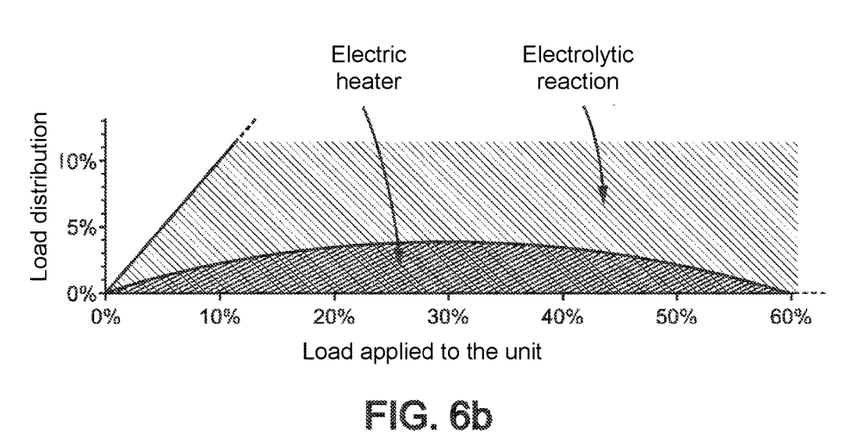

The distribution between the portion of power supplied to the electrolyzer for the electrolytic reaction and the portion of the power redirected towards the electric heaters is given in FIGS. 6a and 6b, some values of which are reproduced in Table 1 below.

TABLE 1

Distribution of the power supplied by the energy source between the stacks in the heater (*percentages are given relative to the maximum power supplied by the source, 110 W)

| Power supplied by the source (W) | Power supplied by the source (%*) | Portion of the power supplied to the stacks (%*) | Portion of the power supplied to the heater (%*) |
|---|---|---|---|
| 0 | 0 | 0 | 0 |
| 11 | 10 | 7.94 | 2.06 |
| 22 | 20 | 16.75 | 3.25 |
| 33 | 30 | 26.44 | 3.56 |
| 44 | 40 | 36.98 | 3.02 |
| 55 | 50 | 48.40 | 1.60 |
| 66 | 60 | 60 | 0 |
| 77 | 70 | 70 | 0 |
| 88 | 80 | 80 | 0 |
| 99 | 90 | 90 | 0 |
| 110 | 100 | 100 | 0 |

Figure 7:
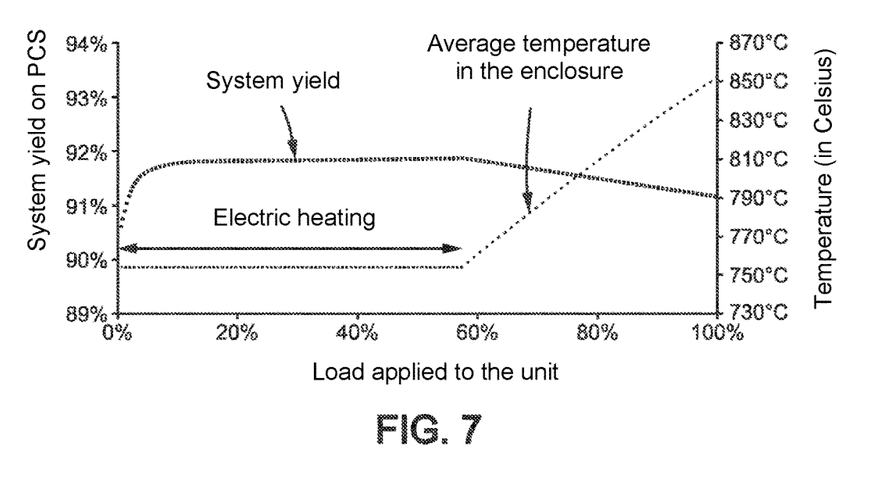
FIG. 7 is a graph showing, as a function of the load coming from the electric source, the yield on GCV (gross calorific value) of the electrolyzer, meaning taking into consideration the auxiliary components (in particular the heating of the liquid water from ambient temperature to 800° C. and the compression of the hydrogen from atmospheric pressure to 30 bar) and the average temperature of the enclosure.

Such driving of the electrolyzer has no impact on the yield of the hydrogen production system overall, as shown in FIG. 7, if the yield of the electrical resistances placed inside the enclosure is considered to be 100%. In fact, FIG. 7 shows that the yield of the system is nearly 91.8% of GCV (gross calorific value) over the entire operating range with the electric heating supplied by the electrical resistances.

Additionally, the power range over which the electrolyzer can operate is extended to between 3 and 100% of the maximum power the electrolyzer, corresponding to a possible operation of the electrolyzer at the voltage included between 1 V and 1.32 V.

The invention claimed is:

1. A method for driving a high temperature electrolyzer comprising one or more stacks of cells, where the one or more stacks of cells are arranged in an enclosure pre-heated to a high temperature and thermally insulated, where the electrolyzer is connected to an electric energy source for its power supply in order to implement an electrolytic reaction and where the method comprises:
    monitoring of the power supplied by the energy source;
    redirecting upstream of the electrolyzer a portion of the power supplied by the energy source in order to heat the one or more stacks of cells when the value of the power supplied becomes lower than a previously set limit value;
    otherwise, no redirecting,
    wherein the previously set limit value is chosen as the value of the power at which thermal gradients greater in absolute value than 50° C./cm appear inside the enclosure.

2. The method according to claim 1, wherein the electrolyzer cells have a surface area S and the distance between the inlet of the gases and the outlet of the gases in a cell is L, the limit value $P_{min}$ per cell is chosen equal to:

$$P_{min} = E(T_{min}) \cdot j(T_{min}) \cdot S;$$

with:

$$T_{min} = T_{water} - \frac{L \cdot \Delta T}{2};$$

$$E(T) = E_N(T) + j(T) \cdot ASR;$$

$$E_N(T) = \frac{\Delta_r G^0(T)}{2 \cdot F} + \frac{R \cdot T}{2 \cdot F} \cdot \ln\left(\frac{SC/2}{1 - SC/2}\right);$$

$$j(T) = \frac{A(T)}{2 \cdot F \cdot ASR} - \frac{E_N(T)}{ASR};$$

$$A(T) = \frac{L \cdot \Delta T}{2} \cdot$$

$$\left(c_{P_{H2}}(2T - T_{water}) + \frac{c_{P_{O2}}(2T - T_{water})}{2} - \frac{c_{P_{H2O}}(T_{water})}{SC}\right) + \Delta_r H(T);$$

where $T_{water}$ is the temperature of the steam entering near the cathode; $\Delta T$ is the maximum tolerable temperature gradient;

$$c_{P_{H2}}$$

is the thermal capacity of the hydrogen at constant pressure;

$$c_{P_{O2}}$$

is the thermal capacity of the oxygen at constant pressure;

$$c_{P_{H2O}}$$

is the thermal capacity of the water at constant pressure; $\Delta_r H$ is the enthalpy of reaction of the electrolysis of water; $\Delta_r G$ is the free enthalpy of reaction of the electrolysis of water; SC is the rate of conversion of water into hydrogen; ASR is the resistivity of the surface of one or more stacks of cells; F is the Faraday constant; and R is the ideal gas constant.

3. The method according to claim 2, wherein the redirected power is obtained by iteration of the following equations until convergence by taking $P_{red,0}=0$ and $P_0=P_{source}$ as initial values:

$$P_{red,m+1} = A(T_{min}) \cdot \dot{n}_m(T_{min}) - P_m;$$

with:

$$\dot{n}_m(T) = \frac{S}{2 \cdot F} \cdot \left(-\frac{E_N(T)}{2 \cdot ASR} + \sqrt{\frac{P_m}{S \cdot ASR} + \left(\frac{E_N(T)}{2 \cdot ASR}\right)^2}\right);$$

$$P_m = P_{source} - P_{red,m};$$

with m≥0 greater than or equal to 0; m indicating the order of the iteration.

4. The method according to claim 1, wherein the L is the distance between the inlet and the outlet of the gases in a cell, where the steam entering from the side of the cathodes is at a temperature $T_{water}$ and $\Delta T$ represents the maximum tolerable temperature gradient, then the limit value of the power below which the redirect is implemented is equal to the power for which the temperature $T_{outlet}$ of the gases at the outlet of the one or more stacks is equal to:

$$T_{outlet}=T_{water}-\Delta T \cdot L.$$

5. The method according to claim 1, wherein the energy source is an intermittent and/or fluctuating energy source.

6. The method according to claim 5, wherein the energy source is a renewable energy source.

7. The method for production of hydrogen or syngas comprising the steps of:
preheating a thermally insulated enclosure, in which the one or more stacks of a high temperature electrolyzer are arranged, to a high temperature;
supplying the electrolyzer with power from an energy source;
circulating water to the cathodes of the electrolyzer to implement an electrolytic reaction;
driving the electrolyzer according to the driving method of claim 1;
recovering near the anodes the oxygen generated by the electrolytic reaction;
recovering near the cathodes the hydrogen generated by the electrolytic reactions and possibly the carbon monoxide in the case of syngas production.

8. The method according to claim 7, wherein the high temperature is included between 300° C. and 1000° C.

9. A system for driving a high temperature electrolyzer comprising one or more stacks of cells arranged in an enclosure pre-heated to a high temperature and thermally insulated, where the electrolyzer is supplied by an energy source, comprising:
a heater to be connected to the energy source for supplying it with power and to be arranged near the one or more stacks of cells for heating thereof;
a switch to be arranged between the energy source and the heater for cutting or adjusting the supply thereto when the value of the power supplied becomes lower than a previously set limit value;
a controller to be connected to the energy source in order to monitor the power provided thereby and connected to the switch for the control thereof,
wherein the previously set limit value is chosen as the value of the power at which thermal gradients greater in absolute value than 50° C./cm appear inside the enclosure.

10. The system according to claim 9, wherein the heater comprises one or more electrical resistance is arranged inside of the one or more stacks of cells or around the stacks.

11. A system for production of hydrogen or syngas comprising:
a high temperature electrolyzer;
an energy source connected to the electrolyzer for supplying the electrolyzer with power;
a thermally insulated enclosure in which the one or more stacks of cells of the electrolyzer are arranged; and
the system for driving a high temperature electrolyzer according to claim 9 for driving the electrolyzer supplied by the energy source.

* * * * *